July 5, 1927.
G. E. NERNEY
1,635,138
EYEGLASS CONSTRUCTION
Filed Nov. 24, 1926
2 Sheets-Sheet 1
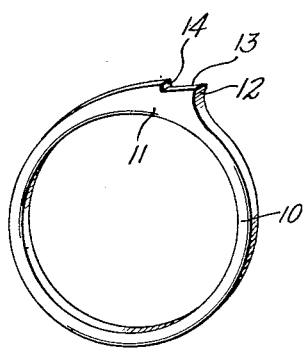
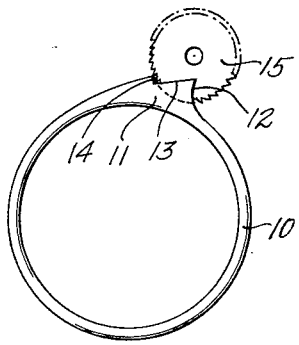
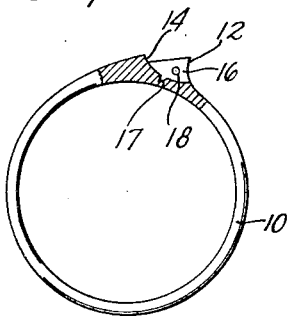
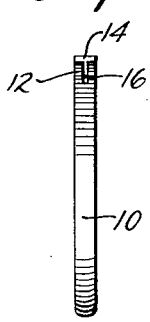
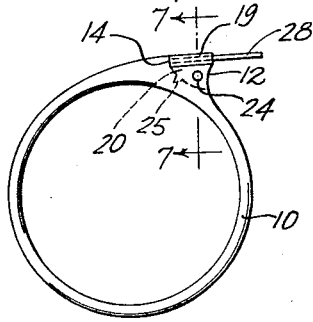
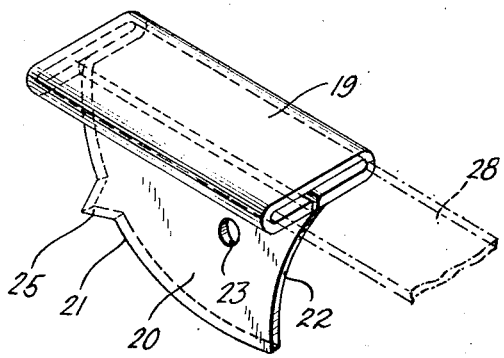
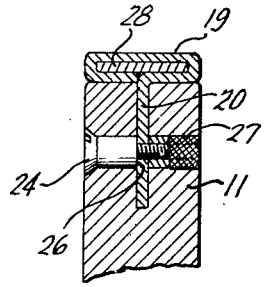
INVENTOR
George E. Nerney
BY
Robert S. Blair ATTORNEY Patented July 5, 1927.

1,635,138

UNITED STATES PATENT OFFICE.

GEORGE E. NERNEY, OF ATTLEBORO, MASSACHUSETTS, ASSIGNOR TO BAY STATE OPTICAL COMPANY, OF ATTLEBORO, MASSACHUSETTS, A CORPORATION OF MAINE.

EYEGLASS CONSTRUCTION.

Application filed November 24, 1926. Serial No. 150,414.

This invention relates to eyeglass construction and more particularly to the construction of non-metallic eyeglass frames.

One of the objects of the invention is to provide an eyeglass frame of what is known as the Oxford type which is practical and well adapted to meet the requirements of use. Another object is to provide a construction of the above nature which is strong and durable. Another object is to provide a construction of the above nature which is pleasing and attractive in appearance. Another object is to provide an art of making eyeglass frames of the above nature which may be carried on conveniently and at low cost. Other objects will be in part obvious or in part pointed out hereinafter.

The invention accordingly consists in the features of construction, combinations of elements, arrangements of parts and in the several steps and relation and order of each of the same to one or more of the others all of the same to be illustratively described herein, and the scope of the application of which will be indicated in the following claims.

In the accompanying drawings, in which are shown one or more of the various possible embodiments of this invention.

Figure 1 is a perspective view of an eyeglass rim member of non-metallic material at an early stage in the manufacture of the eyeglass frame;

Figure 2 illustrates one operation upon the rim member of Figure 1;

Figure 3 shows, partly in section, the rim member after the operation being performed in Figure 2;

Figure 4 is a view from the right of Figure 3;

Figure 5 shows in perspective and greatly enlarged a metal member to be associated with the non-metallic rim member;

Figure 6 shows the non-metallic rim member and the metal member of Figure 5 joined together;

Figure 7 is a section taken along the line 7—7 of Figure 6 and showing the parts in enlarged detail.

Similar reference characters refer to similar parts throughout the several views of the drawings.

Figure 8:
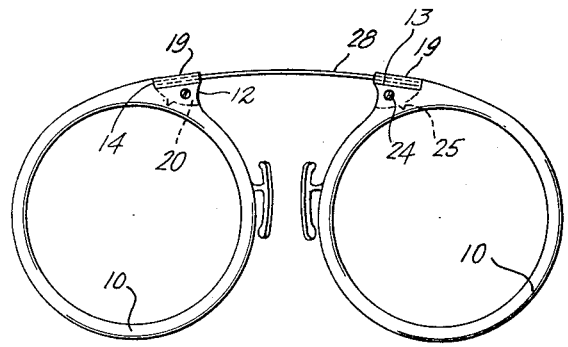
Figures 8, 9 and 10 show various forms of completed eyeglass frames.

Referring now to the drawing in detail, there is shown in Figure 1 an eyeglass rim member 10 of a non-metallic material such as celluloid or other material having characteristics similar to those of celluloid and used in the construction of eyeglass frame parts. This rib member 10 is provided with a portion 11 which is thickened in a radial direction beyond the thickness of the major portion of the rim. This thickened portion 11 is preferably formed by a gradual increase in thickness of the material at one end thereof, and at the other end thereof it terminates preferably in an abrupt shoulder 12. Adjacent the shoulder 12, the outer surface of the portion 11 is cut away or recessed as shown at 13, forming a shoulder 14.

The non-metallic rim member 10 having been formed as shown in Figure 1, it is thereupon subjected to the operation which is illustrated in Figure 2. Into the surface of the part 13 and down through the shoulder 12 is cut a longitudinal groove. This cutting is preferably performed by means of a circular saw 15 of a radius, in proportion to the size of the eyeglass rim, substantially as is indicated in Figure 2. The rotating saw is advanced into the part 13 and the shoulder 12 to substantially the position shown in Figure 2, thereby cutting a groove 16 as shown in Figures 3 and 4. This groove, as will be seen, extends from the base of the shoulder 14 substantially to the base of the shoulder 12, and the bottom of the groove is in the shape of an arc of a circle having a radius equal to that of the saw 15. It will be perceived that this method of cutting the groove 16 is at once extremely simple and expeditious. After forming of the groove, there is formed in the base thereof a small recess or notch 17 and, in addition, there is drilled through the walls of the groove from one side of the rim member to the other an opening 18 the purpose of which will be made clear presently.

Referring now to Figure 5, there is shown a member of metal which is to be secured in place upon the non-metallic rim member 10 prepared as above described. This metal member comprises a box-like or tubular part 19 and has extending longitudinally of the bottom wall thereof a depending flange or fin 20. Preferably this member is made of one piece of sheet metal which is bent into the shape shown. The edge 21 of the flange 20 describes an arc of a circle having a radius equal to that of the saw 15 and hence this edge is adapted to mate snugly with the base of the groove 16. The edge 22 of the flange 20 is shaped to rest flush with the surface of the shoulder 12 when the edge 21 rests snugly against the base of the groove.

In Figure 6, the metal member of Figure 5 is shown in position upon the non-metallic rim member 10, the flange 20 fitting closely within the groove 16 and the edge 22 thereof resting substantially flush with the shoulder 12. The depth of the shoulder 14 is substantially equal to the thickness or height of the hollow portion 19, and the width of the part 19 is equal to the width of the rim member, so that the outer surfaces of the part 11 and of the member 19 rest substantially flush. The flange 20 is provided with an opening 23 which registers with the opening 18 through the walls of the groove 16. Through these registering openings is passed a suitable securing means, preferably a screw 24. On the edge 21 of the flange 20 is formed a projection or spur 25 which registers with the notch 17 in the base of the groove and dependably holds the metal member against rocking about the screw 24.

Considering more particularly the securing screw 24, this part is shown in larger detail in Figure 7. Preferably the screw is of a length substantially equal to the thickness in an axial direction of the non-metallic material 11. As shown in Figure 7, the screw is provided with a shoulder 26 which comes up against the flange 20. After passing through the flange 20 the screw threads into a nut 27 which is preferably a short interiorly threaded tube. The outer surface of the part 27 is preferably corrugated or otherwise made irregular so that this part interlocks with the non-metallic material and is held against turning when the screw 24 is threaded into place.

The construction above described is adapted for securing to the non-metallic rim member an eyeglass frame part such as a nose bridge or a nose-engaging member or the like. Referring to Figure 8, there is shown an eyeglass frame comprising two similar rim members constructed as has just been described and joined together by a metal nose bridge member 28 which takes the form of a flat spring. The end portions of this member 28 are received and securely clamped within the tubular metal members 19. In Figure 5, the spring member 28 is shown in dotted lines. It fits snugly within the part 19, and the top and bottom walls of the latter are compressed in against the spring and have a secure frictional grip thereon. The sheet metal member 19 is, in effect, wrapped around the end portion of the spring nose bridge. The securing together of these parts is preferably performed before the parts are mounted upon the non-metallic rim members.

Figure 9:
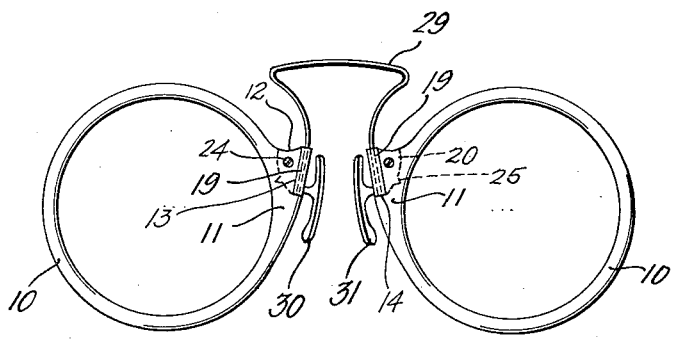

In Figure 9, the two non-metallic rim members 10, provided with the same tubular members 19 and their associated parts, are joined together in a different manner. The rim members are turned so that the parts 19 come on opposite sides of the nose of the wearer, and the rims are joined by a suitably shaped spring nose bridge member 29. In this instance, the nose-engaging members 30 and 31 are secured to the surfaces of the parts 19, for example by soldering. It will be seen that the rim members of Figure 9 are the same as those of Figure 8, being simply turned to a different position.

Figure 10:
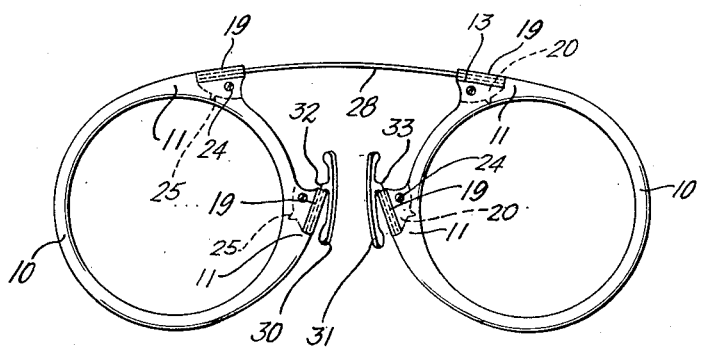

In Figure 10, there are shown two non-metallic rim members 10 each of which is provided with two thickened portions 11 and two members 19 similar to that shown in Figure 5. One of the members 19 of each rim member serves for connecting the spring nose bridge member 28 substantially as in Figure 8. The other two members 19 are so located upon the rims that they come on opposite sides of the nose of the wearer substantially as do the similar parts in the construction of Figure 9. Within these parts 19 are clamped members 32 and 33 which carry the nose guards 30 and 31. If desired, the shanks 32 and 33 may be held in place in the sockets or tubular members 19 by means of a screw or the like so that they are removable and interchangeable.

From the foregoing, it will be seen that there is herein provided a construction which is adapted to various uses and which is of distinct practical advantage. For the purpose of clarity, the term "nose member" will be used herein in a broad sense to indicate a nose bridge member or a part of a nose guard mounting or any similar member.

As many possible embodiments may be made of the mechanical features of the above invention and as the art herein described might be varied in various parts all without departing from the scope of the invention, it is to be understood that all matter hereinabove set forth or shown in the accompanying drawings is to be interpreted as illustrative and not in a limiting sense.

I claim as my invention:

1. In eyeglass construction, in combination, a non-metallic eyeglass rim member, a metal member of tubular form mounted upon said rim member, said tubular metal member having a flange extending into said non-metallic material and rigidly secured therein, and a metal nose member clamped within said tubular member and extending outwardly therefrom.

2. In eyeglass construction, in combination, a non-metallic eyeglass rim member, a metal member mounted upon the outer peripheral surface of said rim member, said metal member being of tubular form and having a flange extending longitudinally thereof and embedded in the nonmetallic material therebeneath, securing means passing through said non-metallic rim member and through said flange, and a metal nose member clamped within said tubular member and projecting outwardly therefrom.

3. In eyeglass construction, in combination, a non-metallic eyeglass rim member, a metal member mounted upon the outer peripheral surface of said rim member, said metal member being of tubular form and having a flange extending longitudinally thereof and embedded in the non-metallic material therebeneath, securing means passing through said non-metallic rim member and through said flange, and a metal nose member clamped within said tubular member and projecting outwardly therefrom, said flange having an irregular edge interlocking with said non-metallic material.

4. In eyeglass construction, in combination, an eyeglass rim member of non-metallic material, a metal nose member, and means securing said nose member to said rim member comprising a sheet metal strip wrapped tightly about a portion of said nose member and having an end portion of said strip thence extending into a recess in said non-metallic material and rigidly secured therein.

5. In eyeglass construction, in combination, an eyeglass rim member of non-metallic material, a metal nose member, and means securing said nose member to said rim member comprising a metal member of tubular form contracted tightly about a portion of said nose member and mounted upon the periphery of said rim member, said tubular member having a longitudinal flange projecting into said non-metallic material, a screw passing from one side of said rim member and through said flange, and a nut for said screw on the opposite side of said rim member and set into the non-metallic material.

6. In eyeglass construction, in combination, an eyeglass rim member of non-metallic material, a metal nose member, and means securing said nose member to said rim member comprising a metal member of tubular form contracted tightly about a portion of said nose member and mounted upon the periphery of said rim member, said tubular member having a longitudinal flange projecting into said non-metallic material, a screw passing from one side of said rim member and through said flange, and a nut for said screw on the opposite side of said rim member, said nut comprising a short tube embedded in said non-metallic material and provided with an irregular surface to prevent its turning when said screw is threaded thereinto.

7. In eyeglass construction, in combination, a non-metallic eyeglass rim member having a portion thereof thickened in a radial direction, said thickened portion terminating at one end thereof in an abrupt shoulder and the outer peripheral surface thereof being cut away adjacent said shoulder, a box-like metal member resting in said cut, the outer surface thereof being substantially flush with the outer surface of the remainder of said thickened portion of said rim member and one end thereof resting substantially flush with said shoulder, said box-like metal member having a part extending radially into said non-metallic member and secured therein, and a metal nose member secured in said box-like member and projecting outwardly therefrom.

8. In eyeglass construction in combination, an eyeglass rim member of non-metallic material having a portion thereof thickened in a radial direction, said thickened portion terminating at one end in a shoulder and having formed therein a longitudinally extending groove adjacent said shoulder, the bottom of said groove being substantially in the shape of an arc of a circle whose center is exterior of said rim, a metal nose member, and means for securing said nose member to said rim including a metal flange resting in said groove and substantially mating therewith and securing means extending through said rim and through said flange, said flange having thereon a projecting spur which bites into the non-metallic material and prevents said flange from rocking in said groove.

9. In eyeglass construction, in combination, a pair of eyeglass rim members of non-metallic material, a connecting nose bridge member of spring metal, and means for securing said bridge member to said rim members comprising a metal member of tubular shape at each end of and embracing an end portion of said bridge member, each of said tubular metal members having a longitudinal flange formed integrally therewith resting in a groove in the non-metallic material and rigidly held therein by securing means passing therethrough.

10. In eyeglass construction, in combination, a non-metallic rim member having a portion thereof thickened in a radial direction, said thickened portion terminating at one end in a shoulder and the outer surface thereof being recessed adjacent said shoulder, a metal nose member, a sheet metal member positioned in said recess having an inner portion and an outer portion between which an end portion of said nose member is received and held, said outer portion resting substantially flush with the outer surface of the non-metallic material, said sheet metal member having also side portions embracing the sides of said end portion of said nose member and an inwardly extending flange portion, and securing means passing through said flange portion and through the non-metallic material.

11. In eyeglass construction, in combination, a non-metallic rim member having a portion thereof thickened in a radial direction, said thickened portion terminating at one end in a shoulder and the outer surface thereof being recessed adjacent said shoulder, a metal nose member, and a sheet metal member positioned in said recess comprising an outer portion whose outer surface rests substantially flush with the outer surface of the non-metallic material adjacent to said recess and beneath which an end portion of said nose member is received and held, the sides of said portion being bent inwardly around the sides of said nose member and thence extending beneath said nose member and between the same and the non-metallic material, said sheet metal member having also an inwardly extending flange portion provided with an opening therethrough, and securing means passing through said flange portion and through the non-metallic material.

12. In eyeglass construction, in combination, a non-metallic rim member having a portion thereof thickened in a radial direction, said thickened portion terminating at one end in a shoulder and the outer surface thereof being recessed adjacent said shoulder, a metal nose member, and a sheet metal member positioned in said recess comprising an outer portion whose outer surface rests substantially flush with the outer surface of the non-metallic material adjacent to said recess and beneath which an end portion of said nose member is received and held, the sides of said portion being bent inwardly around the sides of said nose member and thence extending beneath said nose member and between the same and the non-metallic material, one of said sides extending thence into a groove formed in said rim and being secured therein.

13. In eyeglass construction, in combination, a non-metallic rim member having a portion thereof thickened in a radial direction, said thickened portion terminating at one end in a shoulder and the outer surface thereof being recessed adjacent said shoulder, a metal nose member, and means for securing said nose member to said rim comprising an inner sheet metal part resting flatwise against the bottom of said recess and an outer sheet metal part, an end portion of said nose member being received and held between said two parts, and said inner metal part having on its under side a projecting part embedded in the non-metallic material therebeneath and secured therein.

In testimony whereof, I have signed my name to this specification this 11th day of November, 1926.

GEORGE E. NERNEY.